United States Patent [19]
Mueller, Jr.

[11] 3,869,001

[45] Mar. 4, 1975

[54] FULCRUM BUSHING ON THE RESILIENT BAR DRAFT SENSING

[75] Inventor: Otto Mueller, Jr., Detroit, Mich.

[73] Assignee: Massey-Ferguson Inc., Detroit, Mich.

[22] Filed: Apr. 18, 1974

[21] Appl. No.: 462,003

[52] U.S. Cl. .................................................. 172/7
[51] Int. Cl. .......................................... A01b 63/112
[58] Field of Search .................................. 172/7–10

[56] References Cited
UNITED STATES PATENTS

| | | | |
|---|---|---|---|
| 2,940,530 | 6/1960 | Du Shane | 172/7 |
| 2,946,392 | 7/1960 | Nelson | 172/7 |
| 3,002,570 | 10/1961 | Kienzle | 172/7 |
| 3,022,831 | 2/1962 | Hess | 172/7 |
| 3,812,916 | 5/1974 | Lasoby | 172/7 |

Primary Examiner—Stephen C. Pellegrino
Attorney, Agent, or Firm—Robert L. Farris; George C. Bower

[57] ABSTRACT

A draft control system for a tractor has a load sensing apparatus comprising a beam supported in fulcrum bearings responsive to loads between the tractor and an attached implement. The fulcrum point in the bearing is automatically changed as the load increases so as to reduce the response rate to changes in load. The fulcrum point is further adjustable by rotation of the bearings to vary the response or sensitivity of the system and the effective fulcrum point for compression loads can be located at a different point than the effective fulcrum point for tension loads.

5 Claims, 6 Drawing Figures

FULCRUM BUSHING ON THE RESILIENT BAR DRAFT SENSING

This invention relates to tractors of the type equipped with a power controlled implement hitch linkage and more particularly with an improved draft sensing unit and control for such linkage.

Tractors, particularly those of the agricultural type, generally utilize an elevatable hydraulically powered three-point hitch linkage for coupling and mounting the tractor to implements. These generally employ a draft force sensing means which either directly or indirectly measures the draft loads between the implement and the tractor and acts upon a linkage control system to raise or lower the linkage and mounted implement so as to maintain a substantially constant preset draft load.

This method of automatically controlling the linkage may measure the forces acting through certain components of the linkage. Changes in these forces may then be used to act to control the vertical position of the linkage so as to maintain the forces relatively constant. Various means of measuring the forces in the linkage have been employed including connecting the upper or lower draft links to the tractor through a resilient member. Changes in the deflection of the resilient member can then be used as a control unit to a hydraulic linkage control.

The linkage loads may be measured by measuring the bending deflection of a fulcrum beam member in the form of a cross shaft having a stiff member attached thereto in the manner shown in the pending United States application Ser. No. 200,958 - Filed Nov. 22, 1971, now U.S. Pat. No. 3,812,916 - entitled "Draft Sensing Unit for Tractor."

In the above mentioned application, the deflection of the cross member is proportional to the actual load thereon. This results in a given change in the load on the cross member having the same effect when the load is relatively large as when the load is relatively small. In order to provide for a variable sensitivity or response that varies in accordance with changes in the load, there have been proposed means for changing the length of the movement arms of the cross member in effect making it function as a variable rate spring. While this gives the operator a better control over the full range of load forces, it does not permit the control system to be adjusted to a variety of implements. For example, where a relatively heavy, fully mounted implement is operated at a shallow depth the resultant load forces on the resilient cross member may be very small. Under such a condition it would be desirable to have a finer sensitivity or reaction to change in draft forces then would be the case with a light weight deep depth implement where the resultant load forces on the resilient cross member are quite large.

It is therefore an object of this invention to provide a draft measuring apparatus that can be selectively adjusted provide different response rates or sensitivities.

This and other objects and advantages will be readily apparent from the following specification and accompanying drawings in which.

Figure 1:
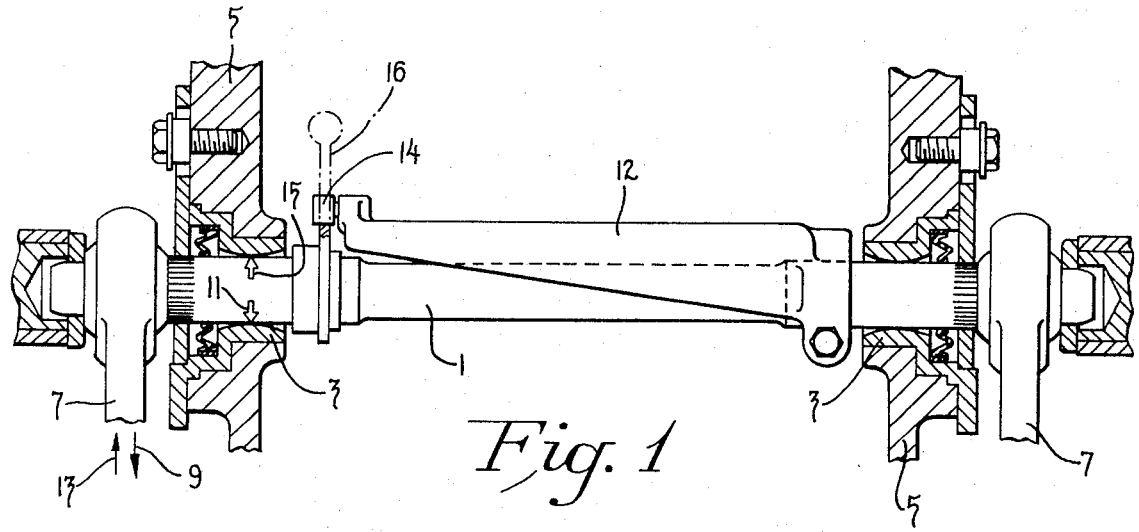
FIG. 1 is generally vertical cross-sectional view also showing the draft sensing unit and the mounting thereof.

Referring now to the drawings:

FIG. 1 shows a draft sensing apparatus generally similar to that shown and described in the above mentioned application. The draft sensing apparatus includes a load sensing shaft 1 supported on spaced fulcrum bearings 3 which are in turn supported in tractor housing 5. Pivotally connected on the outer ends of the shaft are the draft links 7 of the tractor linkage. Draft forces in the lower links 7 in the direction of arrow 9 will cause the shaft or beam 1 to bend about the rear mount portion of the fulcrum bearings. The contact is at the point indicated by arrow 11.

The deflection of the beam or shaft is measured by a rigid arm 12 attached at one end to the beam and having its free end carrying a roller 14 that contacts a cam member 16 rotatably mounted on the beam. Details and operation of the sensing apparatus are fully disclosed in the above mentioned application.

Figure 5:
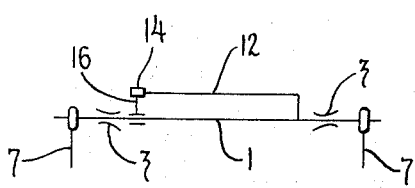
FIG. 5 is a diagrammatic view of the draft sensing means in an unloaded condition.
Figure 6:
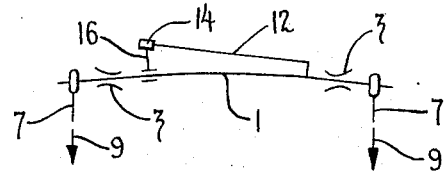
FIG. 6 is another diagrammatic view of the draft sensing means in a loaded condition.

FIG. 5 illustrates the beam and sensing apparatus in unloaded condition while FIG. 6 illustrates the same in loaded condition with the free end of the arm 12 spaced from the beam.

As the load increases on the beam 1 and it bends, the contact point moves outward along the arcuate internal surfaces of the bearing reducing the length of the moment arm between the connection of the links 7 and the fulcrum point. This acts to reduce the response or sensitivity of the control to given changes in draft forces.

If the resultant of the forces on the draft links are such that the links are in compression instead of tension, such resultant force represented by the arrow 13, the forward side of the beam 1 acts against the opposite inner side of the fulcrum bearing at arrow 15.

Figure 2:
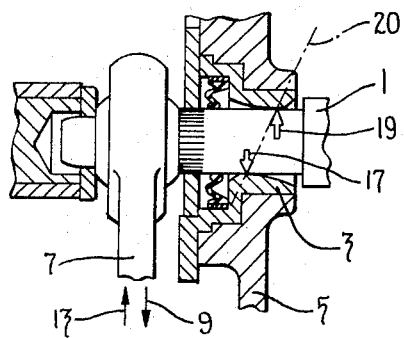
FIG. 2 is a partial sectional view of one of the fulcrum bearings in one extreme sensitivity position.

The bearings 3 are formed such that the internal surface is not tapered identically on directly opposite sides but is shaped so that a plane passing through a circumferential line corresponding to the smallest internal diameter is not perpendicular to the axis of the beam and bearing but forms an acute angle as shown by the line 20 in FIG. 2.

At one longitudinal cross sectional point of the bearing the smallest diameter points are axially directly opposite to each other. In the FIG. 1 illustration the bearing is positioned such that these points are located in a horizontal plane and face to the front and rear of the tractor.

Figure 4:
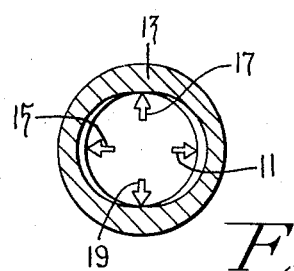
FIG. 4 is an enlarged sectional view of the fulcrum bearing.

The smallest diameter points directly opposite to each other and lying in a vertical plane at right angles to the horizontal plane passing through arrows 11 and 15, are axially spaced. These points are represented by arrows 17 and 19 in FIG. 4.

Figure 3:
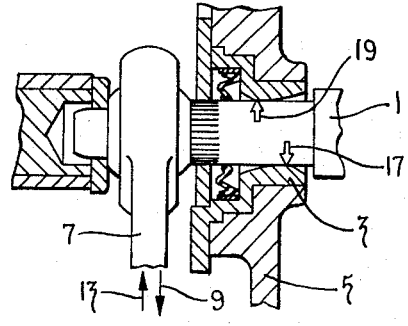
FIG. 3 is a partial sectional view of one of the fulcrum bearings in the other extreme sensitivity position.

FIG. 2 illustrates the bearing 3 rotated 90° from the position in FIG. 1 with the smallest diameter point at arrow 17 contacting the forward side of the beam 1 and the smallest diameter point at arrow 19 contacting the rearward side of the beam 1. FIG. 3 illustrates the bearing turned 180° from that in FIG. 2, with the point at arrow 17 now contacting the rearward sides of the beam 1 and the point at arrow 19 contacting with the forward side of the beam 1.

With bearing rotated to the position shown in FIG. 2 the apparatus is less sensitive to forces in the direction of the arrow 9 than those in direction of arrow 13. Since the range of forces occuring in the direction of arrow 9 is generally greater than the range of forces in the direction of arrow 13, this means that the degree of deflection of the beam between zero and maximum loads will be comparable for forces in either direction. By adjusting the bearing to different positions it is possible to provide a full range of control for different implements having different load effects on the tractor linkage.

It will be seen that the invention has provided an efficient and yet simple means for positively adjusting the sensitivity of a draft control system for a tractor. Modifications and changes will be apparent to those skilled in the art and such modifications and changes are deemed to be within the scope of the invention which is limited only by the following claims:

I claim:

1. A draft sensing apparatus for a tractor having draft means for connecting an implement to the tractor, said apparatus including a resilient beam supported by a pair of spaced fulcrum bearings carried by the tractor, said means connected to the beam adjacent the ends thereof extending beyond said fulcrum bearings and adapted to cause bending of the beam about said bearings, deflection sensing means for measuring the deflection of the beam caused by draft forces acting on the beam through the draft means, said fulcrum bearings having internal arcuate surfaces tapering from a relatively large diameter to a small diameter and back to a large diameter, the internal surface formed so that a plane passing through the smallest diameter of the bearing extends at an acute angle to the axis of the bearing whereby the effective fulcrum point in said bearing contacts the rearmost portion of said beam at a variable point depending on the rotational position of the beam.

2. The draft sensing means of claim 1 wherein the bearings are rotationally mounted in the tractor and means are provided for rotating said bearings about their longitudinal axis to change the effective fulcrum point and thus, the length of the moment arm formed between the connection of the draft means and said effective fulcrum point.

3. The draft sensing means of claim 1 wherein the fulcrum bearing provides one effective fulcrum point for compression loads on the linkage and a second different effective fulcrum point for tension loads in the linkage.

4. The draft sensing means of claim 3 wherein the fulcrum bearings are rotationally mounted and wherein in one rotational position the opposite effective fulcrum points for compression and tension loads are equally spaced from the connection of the draft means to the ends of the beam, in a second position the opposite effective fulcrum point for compression loads is closer to the said connection than the effective fulcrum point for tension loads, and a third position wherein the opposite effective fulcrum point for tension loads is closer to said connection that the effective fulcrum point for compression loads.

5. Draft sensing apparatus for a tractor including a resilient beam carried by spaced fulcrum bearings, means connecting the beam to the tractor draft linkage whereby draft loads cause bending of the beam about the bearings, control means responsive to deflection of the beam for controlling the draft linkage, said bearings having a plurality of effective fulcrum points spaced different effective moment arm distances from the connecting means, means for adjusting the position of the bearings so that different effective fulcrum points are brought into contact with the beam whereby the said effective distances can be adjusted to thereby vary the sensitivity of the control.

* * * * *

PO-1050
(5/69)

UNITED STATES PATENT OFFICE
CERTIFICATE OF CORRECTION

Patent No. 3,869,001          Dated March 4, 1975

Inventor(s) Otto Mueller, Jr.

It is certified that error appears in the above-identified patent and that said Letters Patent are hereby corrected as shown below:

Claim 4, line 11, change "that" to --than--.

Signed and Sealed this nineteenth Day of August 1975

[SEAL]

Attest:

RUTH C. MASON
*Attesting Officer*

C. MARSHALL DANN
*Commissioner of Patents and Trademarks*